(12) United States Patent
Soubrant et al.

(10) Patent No.: US 11,970,022 B2
(45) Date of Patent: Apr. 30, 2024

(54) RIM FOR A BRAKED AIRCRAFT WHEEL

(71) Applicant: SAFRAN LANDING SYSTEMS, Velizy Villacoublay (FR)

(72) Inventors: Pierrick Soubrant, Velizy Villacoublay (FR); Michaël Arnoux, Clermont-Ferrand (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 260 days.

(21) Appl. No.: 16/194,804

(22) Filed: Nov. 19, 2018

(65) Prior Publication Data
US 2019/0152590 A1    May 23, 2019

(30) Foreign Application Priority Data
Nov. 21, 2017 (FR) ..................................... 17 61016

(51) Int. Cl.
*B60B 21/02* (2006.01)
*B60B 25/00* (2006.01)
*B64C 25/36* (2006.01)
*B60B 21/04* (2006.01)
*B60B 21/08* (2006.01)

(52) U.S. Cl.
CPC ............ *B60B 21/02* (2013.01); *B60B 21/026* (2013.01); *B60B 25/002* (2013.01); *B64C 25/36* (2013.01); *B60B 21/023* (2013.01); *B60B 21/04* (2013.01); *B60B 21/08* (2013.01); *B60B 2900/513* (2013.01); *B60Y 2200/50* (2013.01); *B60Y 2200/51* (2013.01)

(58) Field of Classification Search
CPC ..... B60B 21/02; B60B 21/023; B60B 21/026; B60B 25/02; B60B 25/002; B60B 3/08
See application file for complete search history.

(56) References Cited

U.S. PATENT DOCUMENTS 2,566,663 A * 9/1951 Hollerith ............... B60B 25/002
                                                        301/6.7
3,172,787 A * 3/1965 Martenet ................ B60B 21/02
                                                        148/535

(Continued)

FOREIGN PATENT DOCUMENTS

EP    2 746 611 A1    6/2014
FR    2 990 188 A1    11/2013

OTHER PUBLICATIONS

French Search Report for FR 1761016 dated Jul. 18, 2018.

*Primary Examiner* — Jason R Bellinger
(74) *Attorney, Agent, or Firm* — Sughrue Mion, PLLC

(57) ABSTRACT

A rim for a braked aircraft wheel includes an outer circular portion whose ends are terminated flanges for receiving a tire. The outer circular portion is connected by a wheel disk to a hub for fitting on an undercarriage axle in order to rotate about an axis of rotation coinciding with a central axis of the rim. The rim is designed to receive the tire on the outside of the outer circular portion and a brake on the inside of the outer circular portion, the outer circular portion presenting on one side of the wheel disk that is to receive the brake, in a plane containing the central axis of the wheel, a profile that has two slopes forming non-zero angles with the central axis, the two slopes extending in the continuation of one another from the wheel disk to the corresponding flange and flaring towards said corresponding flange.

19 Claims, 5 Drawing Sheets

(56) References Cited

U.S. PATENT DOCUMENTS

| | | | | |
|---|---|---|---|---|
| 3,251,437 | A | | 5/1966 | Moyer et al. |
| 3,734,247 | A | * | 5/1973 | Buckley ................ F16D 65/847 |
| | | | | 188/264 A |
| 4,010,828 | A | * | 3/1977 | Ditlinger ............... F16D 65/543 |
| | | | | 188/196 P |
| 4,129,202 | A | * | 12/1978 | Winters .................... B60T 8/52 |
| | | | | 303/112 |
| 4,537,449 | A | * | 8/1985 | Hayashi .................. B60B 3/002 |
| | | | | 301/35.629 |
| 5,018,566 | A | * | 5/1991 | Thoni ..................... B60B 3/005 |
| | | | | 152/396 |
| 6,364,425 | B1 | * | 4/2002 | Marquis ............... B22D 15/005 |
| | | | | 301/65 |
| 6,763,865 | B1 | * | 7/2004 | Bernoni .................... B60B 3/00 |
| | | | | 152/396 |
| 9,863,497 | B2 | * | 1/2018 | Lim .......................... B60B 7/00 |
| 10,363,777 | B2 | * | 7/2019 | Lim ....................... B60B 21/023 |
| 2012/0146392 | A1 | * | 6/2012 | Hamada .................. B60B 3/044 |
| | | | | 301/5.24 |
| 2015/0165510 | A1 | * | 6/2015 | Egsgaard .................. B21K 1/38 |
| | | | | 29/894.353 |
| 2015/0273934 | A1 | * | 10/2015 | Huidekoper ............ B60B 23/10 |
| | | | | 301/11.1 |

* cited by examiner

RIM FOR A BRAKED AIRCRAFT WHEEL

CROSS REFERENCE TO RELATED APPLICATION

This application is based on and claims priority under 35 U.S.C. § 119 from French Patent Application No. 1761016 filed on Nov. 21, 2017 in the France Intellectual Property Office, the disclosure of which is herein incorporated by reference in its entirety.

The invention relates to a rim for a braked aircraft wheel.

BACKGROUND OF THE INVENTION

Aircraft wheels are known that are mounted on main undercarriages of aircraft and that are designed to co-operate with brakes. In general, the brake comprises disks extending inside the rim of the wheel, including stator disks that are prevented from rotating and that are arranged in alternation with rotor disks that are driven in rotation by the rim of the wheel via bars that are secured to the rim and that are engaged in peripheral notches in the rotor disks. Controlled pressure is applied to the set of disks to generate friction between the facing disks, and thus to generate a braking torque that slows down rotation of the wheel. The temperature of the brake disks can rise very considerably as a result of braking exerted on the wheel. It is important to ensure that the temperature of the rim does not reach temperatures that might be harmful to the tire carried by the rim. In addition, takeoff is authorized only if the temperature of the brakes does not exceed a given safety threshold that is set at 400° C. This constraint sometimes requires the pilot to wait for the temperature of all of the brakes to drop below said threshold in order to be able to start taxiing, thereby increasing turnaround time (TAT).

In order to accelerate cooling of the brakes, it is known to organize a convective flow of air around the brake disks by means of a fan mounted at the end of the axle. Nevertheless, in addition to impeding access to the wheel for replacement or maintenance purposes, such equipment is heavy (typically several kilograms), is a source of noise, and increases the risk of the carbon of the brake disks oxidizing. Aircraft manufacturers seek to avoid using such equipment.

OBJECT OF THE INVENTION

The invention seeks to propose a rim that naturally enhances the cooling of brake disks without having recourse to a fan.

SUMMARY OF THE INVENTION

In order to achieve this object, the invention provides a rim for a braked aircraft wheel, the rim comprising an outer circular portion terminated at its ends by flanges for receiving a tire, the outer circular portion being connected by a wheel disk to a hub for fitting on an undercarriage axle in order to rotate about an axis of rotation coinciding with a central axis of the rim, the rim being designed to receive a tire on the outside of the outer circular portion and a brake on the inside, on one side of the wheel disk. According to the invention, the outer circular portion on the side of the wheel disk that is to receive a brake presents, in a plane containing the central axis of the wheel, a profile that has two slopes relative to a direction parallel to the central axis on going from the wheel disk to the corresponding flange, and flaring towards the flange.

That profile with two slopes arranges a gap between the periphery of the brake disks and the rim, thereby enhancing a natural convective flow of air passing through the wheel disk to the outside, thereby improving the natural cooling of the brake. The profile also enhances heat removal by radiation.

DESCRIPTION OF THE FIGURES

The invention can be better understood in the light of the following description of a particular embodiment of the invention given with reference to the figures of the accompanying drawings, in which.

DETAILED DESCRIPTION OF THE INVENTION

Figure 1A:
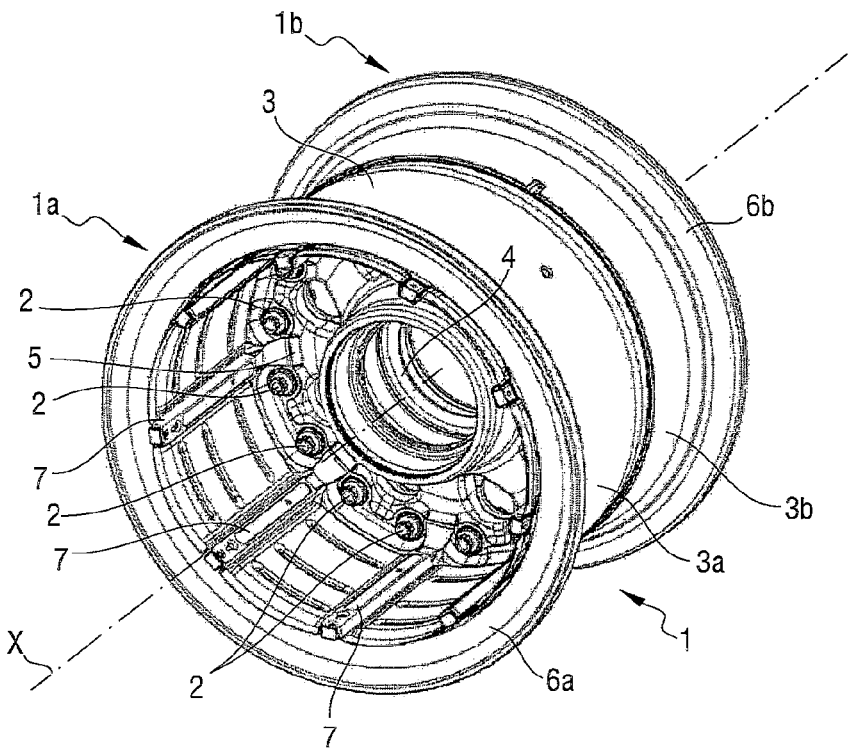
FIG. 1A is a perspective view of a prior art aircraft wheel rim.
Figure 2A:
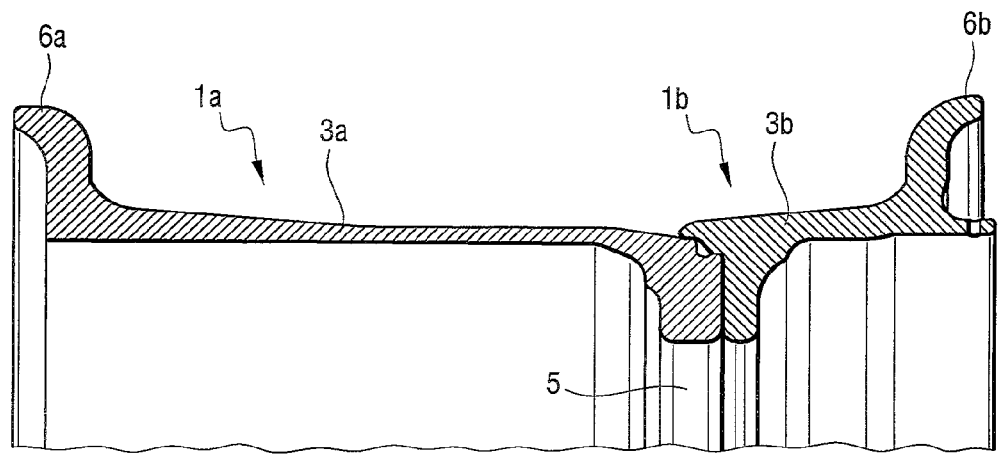
FIG. 2A is a fragmentary section view on a plane containing the central axis of the FIG. 1A rim.

FIG. 1A shows a conventional braked wheel rim 1 made up of two semi-rims 1a and 1b that are secured to each other by bolts 2 through the wheel disk. The rim 1 has a circular outer portion 3 for receiving a tire (not shown). The rim includes a hub 4 connected by a perforated wheel disk 5 to its circular outer portion 3. The hub 4 is for receiving bearings for mounting the wheel on an aircraft undercarriage axle so that the wheel rotates about an axis of rotation that coincides with a central axis X of the wheel. The circular outer portion 3 comprises two parts 3a and 3b that are carried respectively by the two half-rims 1a and 1b and that are terminated by respective flanges 6a, 6b. In this example, the half-rim 1a is for receiving the brake disks and it includes ridges 7 that extend parallel to the central axis X in order to receive respective bars that are engaged in peripheral notches in the brake disks. As can be seen in FIG. 2A, the profile of the outer circular portion 3 extends substantially parallel to the central axis X.

Figure 1B:
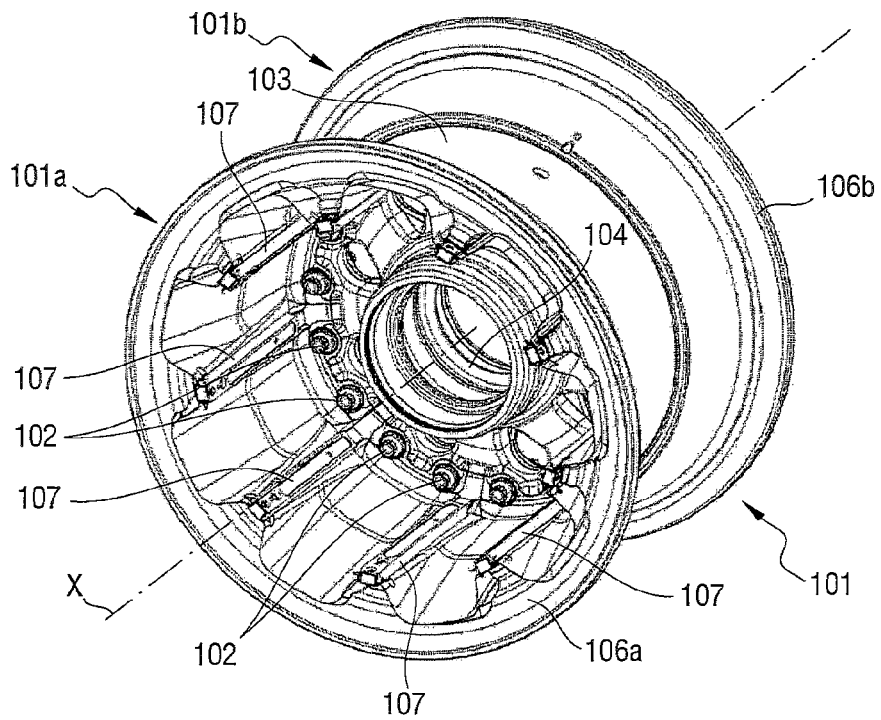
FIG. 1B is a perspective view analogous to the view of FIG. 1A showing an aircraft wheel rim in a particular embodiment of the invention.
Figure 2B:
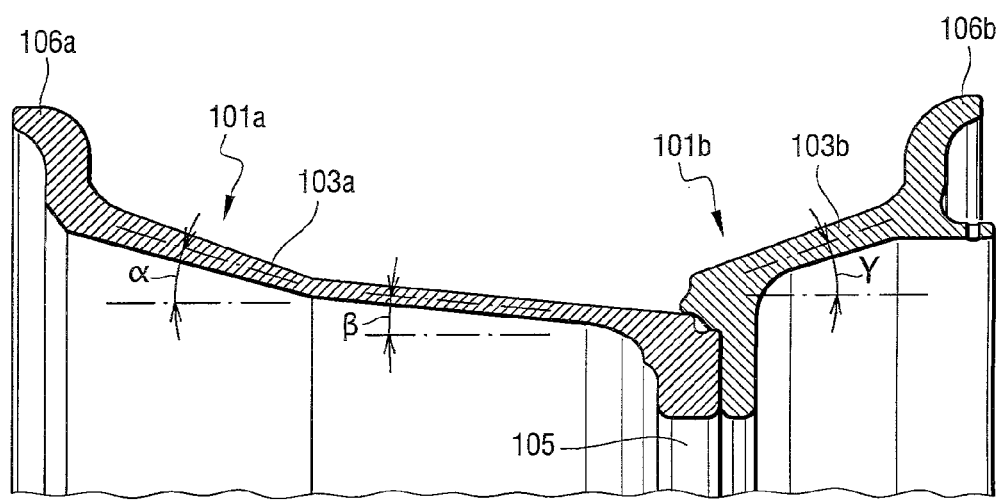
FIG. 2B is a fragmentary section view on a plane containing the central axis of the FIG. 1B rim.

With reference to FIGS. 1B and 2B, which show a rim in a particular embodiment of the invention, and in which elements that are in common with the prior art rim are given the same numerical references plus one hundred, the rim 101 still has a circular outer portion 103 and it is still made up of two parts 101a and 101b that are connected together by bolts 102 through the wheel disk 105. However, and in accordance with the invention, the profile of the part 103a of the outer circular portion 103 presents two slopes (at angles α and β) relative to a direction parallel to the central axis X so as to flare away from the wheel disk 105 towards the flange 106a. This configuration requires an angle (angle γ) to be given to the profile of the part 103b so that the flange 106b is at the same height as the flange 106a.

Figure 3A:
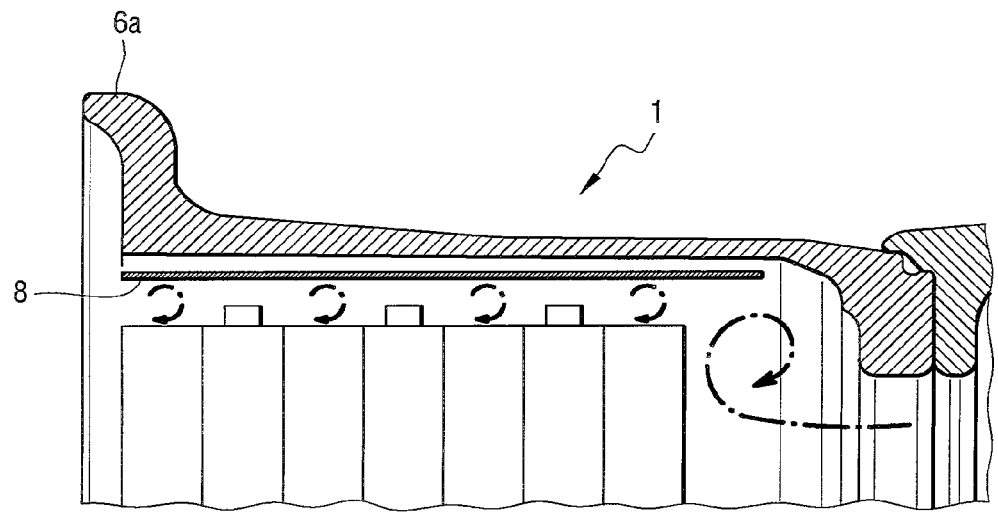
FIGS. 3A and 3B are figures identical to FIGS. 2A and 2B showing the convective flows around the brake disks.
Figure 3B:
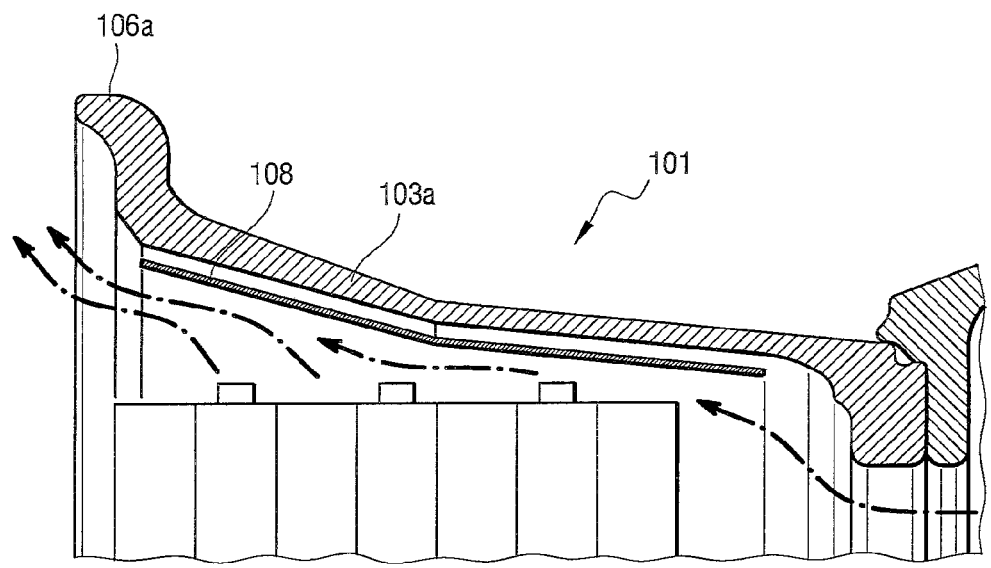
Figure 4A:
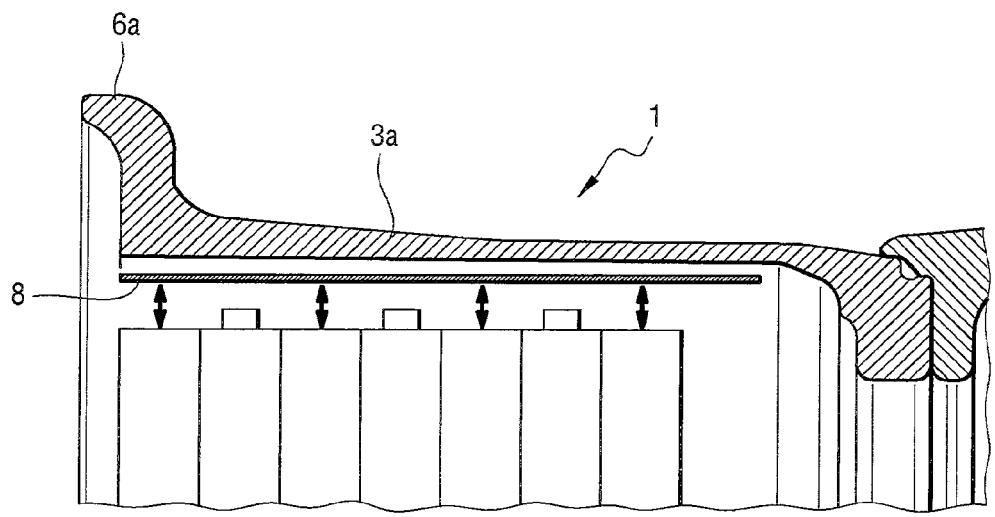
FIGS. 4A and 4B are figures identical to FIGS. 2A and 2B showing the path of radiation from the brake disks.
Figure 4B:
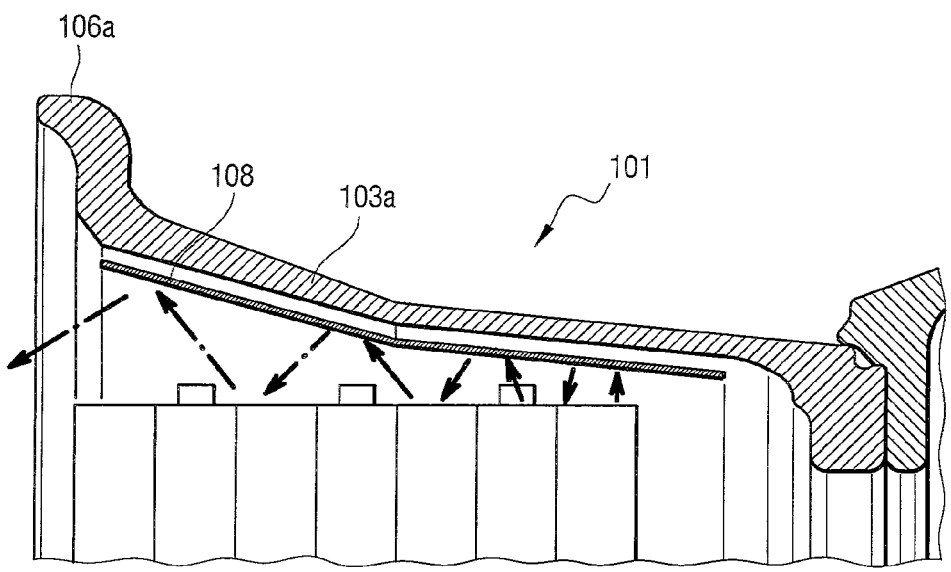

The two slopes of the invention leave a gap between the rim 101 and the periphery of the stack of brake disks, thereby making it easier to establish a natural convective flow passing through perforations in the wheel disk 105 in order to sweep over the brake disks and be discharged to the outside. The gap made available in this way increases the spacing between the rim and the source of heat constituted by the brake disks. As can be seen by comparing FIGS. 3A and 3B, in which movements of air are represented by arrows, in a conventional rim the air that is heated by the brake disks tends to stagnate between the rim and the brake disks, whereas it is discharged naturally from a rim of the invention because of the flared gap around the periphery of the brake disks. Furthermore, and as can be seen by comparing FIGS. 4A and 4B, the heat flux radiated by the brake disks is reflected on the screen 8 that protects the conventional rim and is returned towards the disks, whereas in the rim of the invention, the radiated heat flux is reflected on the screen 108, which directs this radiation to the outside. These arrangements greatly improve the cooling of the brake disks and contribute to reducing turnaround time.

Figure 5:
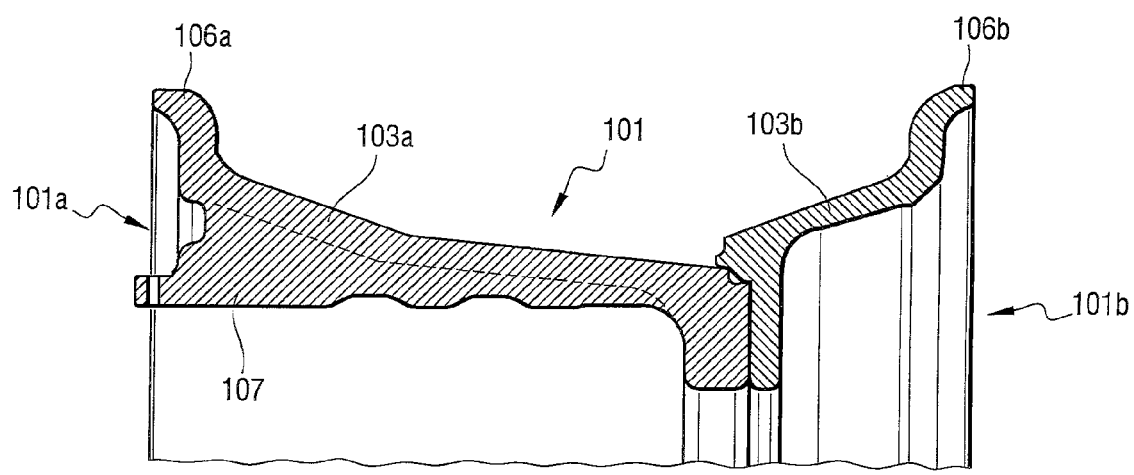
FIG. 5 is a fragmentary section view on a plane containing the central axis of the FIG. 1B rim, the section being through one of the ridges supporting a bar.

Naturally, and as can be seen in FIG. 5, in order to enable the bars to extend in a direction that is parallel to the central axis X having two slopes leads to ridges 107 that are of greater volume and thus of greater weight than in a conventional rim. Nevertheless, the inventors have verified that this increase in weight of the ridges is significantly less than the increase in weight that would result from using a single slope. This constitutes another advantage of two slopes.

It should also be observed, that for brake disks of a given diameter, the flanges 106a and 106b are spaced apart from the central axis X by a distance that is greater than that of the flanges of a conventional rim, which makes it necessary to mount tires having an attachment diameter (or inside diameter) that is greater.

Nevertheless, these drawbacks are more than compensated by the improvement in cooling obtained without using a fan. Simulations have shown that for angles lying in the following ranges:

$$5° \leq \alpha \leq 30°, 0° \leq \beta \leq 30°$$

where the angle $\alpha$ is the slope of the profile going from the flange 106a and the angle $\beta$ is the slope of the profile going to the wheel disk 105, the cooling of the brake disks is accelerated compared with a conventional rim, thereby leading to a reduction in turnaround time that may be as much as 20%. From the point of view of the ratio of the reduction in turnaround time divided by the increase in weight, the most favorable situation occurs when the angle $\alpha$ is greater than the angle $\beta$, as shown in the figures, and in particular when the angles $\alpha$ and $\beta$ are included in the following ranges:

$$10° \leq \alpha \leq 30°, 0° \leq \beta \leq 100.$$

The invention is not limited to the above description and, on the contrary, it covers any variant coming within the ambit defined by the claims. In particular, although the rim in the example shown is made up of two parts, the invention naturally applies to a rim made as a single part, thus having one of its flanges that is removable in order to enable the tire to be put into place.

The invention claimed is:

1. A rim of a braked aircraft wheel, the rim comprising an outer circular portion whose ends are terminated by flanges for receiving a tire, the outer circular portion being connected by a wheel disk to a hub for fitting on an undercarriage axle in order to rotate about an axis of rotation coinciding with a central axis of the rim, the rim being designed to receive the tire on the outside of the outer circular portion and a brake on the inside of said outer circular portion, the outer circular portion presenting on one side of the wheel disk that is to receive the brake, in a plane containing the central axis of the wheel, a profile that has two slopes forming non-zero angles with the central axis, the two slopes extending as an extension of one another from the wheel disk up to the corresponding flange and flaring towards said corresponding flange, and the inside of the outer circular portion receiving a thermal protection screen which presents a profile identical to the profile of the outer circular portion of the rim, the profile of the thermal protection screen extending parallel to the profile of the rim.

2. The rim according to claim 1, wherein the angle ($\alpha$) formed by the slope of the profile going from the corresponding flange is between 5° and 30°, and the angle ($\beta$) formed by the slope of the profile going to the wheel disk is greater than 0° and less than 30°.

3. The rim according to claim 2, wherein the angle ($\alpha$) formed by the slope of the profile going from the corresponding flange is greater than the angle ($\beta$) formed by the slope of the profile going to the wheel disk.

4. The rim according to claim 3, wherein the angle ($\alpha$) formed by the slope of the profile going from the corresponding flange is between 10° and 30°, and the angle ($\beta$) formed by the slope of the profile going to the wheel disk is greater than 0° and less than 10°.

5. The rim according to claim 1, wherein the rim comprises two half-rims connected together by bolts through the wheel disk.

6. A braked aircraft wheel comprising a rim which has an outer circular portion whose ends are terminated by flanges for receiving a tire, the outer circular portion being connected by a wheel disk to a hub for fitting on an undercarriage axle in order to rotate about an axis of rotation coinciding with a central axis of the rim, the rim being designed to receive the tire on the outside of the outer circular portion and a brake on the inside of said outer circular portion, the outer circular portion presenting on one side of the wheel disk that is to receive the brake, in a plane containing the central axis of the braked aircraft wheel, a profile that has two slopes forming non-zero angles with the central axis, the two slopes extending as an extension of one another from the wheel disk up to the corresponding flange and flaring towards said corresponding flange, and the inside of the outer circular portion receiving a thermal protection screen which presents a profile identical to the profile of the outer circular portion of the rim, the profile of the thermal protection screen extending parallel to the profile of the rim.

7. The braked aircraft wheel according to claim 6, wherein the angle ($\alpha$) formed by the slope of the profile going from the corresponding flange is between 5° and 30°, and the angle ($\beta$) formed by the slope of the profile going to the wheel disk is between 0° and 30°.

8. The braked aircraft wheel according to claim 7, wherein the angle ($\alpha$) formed by the slope of the profile going from the corresponding flange is greater than the angle ($\beta$) formed by the slope of the profile going to the wheel disk.

9. The braked aircraft wheel according to claim 8, wherein the angle ($\alpha$) formed by the slope of the profile going from the corresponding flange is between 10° and 30°, and the angle ($\beta$) formed by the slope of the profile going to the wheel disk is between 0° and 10°.

10. The braked aircraft wheel according to claim 6, wherein the rim comprises two half-rims connected together by bolts through the wheel disk.

11. The rim according to claim 1, wherein a second slope of the two slopes extends directly from an end of a first slope of the two slopes.

12. The braked aircraft wheel according to claim 6, wherein a second slope of the two slopes extends directly from an end of a first slope of the two slopes.

13. A method for accelerating cooling of a stack of disks of a braked aircraft wheel that comprises a rim having an outer circular portion whose ends are terminated by flanges for receiving a tire, the outer circular portion being connected by a wheel disk to a hub for fitting on an undercarriage axle in order to rotate about an axis of rotation coinciding with a central axis of the rim, the rim being designed to receive the tire on the outside of the outer circular portion and the stack of disks on the inside of said outer circular portion, the method comprising the adoption, by the outer circular portion on one side of the wheel disk that receives the stack of disks, of a profile that has, in a plane containing the central axis of the wheel, two slopes forming non-zero angles with the central axis, the two slopes extending as an extension of one another from the wheel disk up to the corresponding flange and flaring towards said corresponding flange, and the inside of the outer circular portion receiving a thermal protection screen which presents a profile identical to the profile of the outer circular portion of the rim, the profile of the thermal protection screen extending parallel to the profile of the rim.

14. The according to claim 13, wherein the angle ($\alpha$) formed by the slope of the profile going from the corresponding flange is between 5° and 30°, and the angle ($\beta$) formed by the slope of the profile going to the wheel disk is between 0° and 30°.

15. The method according to claim 14, wherein the angle ($\alpha$) formed by the slope of the profile going from the corresponding flange is greater than the angle ($\beta$) formed by the slope of the profile going to the wheel disk.

16. The method according to claim 15, wherein the angle ($\alpha$) formed by the slope of the profile going from the corresponding flange is between 10° and 30°, and the angle ($\beta$) formed by the slope of the profile going to the wheel disk is between 0° and 10°.

17. The method according to claim 13, wherein the rim comprises two half-rims connected together by bolts through the wheel disk.

18. The rim according to claim 1, wherein the profile has only the two slopes.

19. The braked aircraft wheel according to claim 6, wherein the profile has only the two slopes.

* * * * *